(12) United States Patent
Scott et al.

(10) Patent No.: US 9,719,308 B2
(45) Date of Patent: Aug. 1, 2017

(54) POLYCRYSTALLINE DIAMOND COMPOSITE COMPACT ELEMENTS AND TOOLS INCORPORATING SAME

(71) Applicants: Danny Eugene Scott, Montgomery, TX (US); Kurtis Karl Schmitz, Mustang, OK (US); Clement David Van Der Riet, Newmarket on Fergus (IE); Antionette Can, Springs (ZA)

(72) Inventors: Danny Eugene Scott, Montgomery, TX (US); Kurtis Karl Schmitz, Mustang, OK (US); Clement David Van Der Riet, Newmarket on Fergus (IE); Antionette Can, Springs (ZA)

(73) Assignees: Element Six Limited (IE); Baker Hughes Incorporated, Houston, TX (US)

( * ) Notice: Subject to any disclaimer, the term of this patent is extended or adjusted under 35 U.S.C. 154(b) by 0 days.

(21) Appl. No.: 14/464,788

(22) Filed: Aug. 21, 2014

(65) Prior Publication Data
US 2015/0083502 A1 Mar. 26, 2015

Related U.S. Application Data

(63) Continuation of application No. 12/847,500, filed on Jul. 30, 2010, now abandoned.
(Continued)

(51) Int. Cl.
*E21B 10/567* (2006.01)
*E21B 10/573* (2006.01)
(Continued)

(52) U.S. Cl.
CPC ........ *E21B 10/5735* (2013.01); *E21B 10/567* (2013.01); *E21B 10/573* (2013.01);
(Continued)

(58) Field of Classification Search
CPC ......... E21B 2010/561; E21B 2010/564; E21B 1/567; E21B 10/573; E21B 10/5735
See application file for complete search history.

(56) References Cited

U.S. PATENT DOCUMENTS

| | | | |
|---|---|---|---|
| 4,224,380 A * | 9/1980 | Bovenkerk | B01J 3/062 |
| | | | 428/545 |
| 4,726,718 A | 2/1988 | Meskin et al. | |
| | (Continued) | | |

FOREIGN PATENT DOCUMENTS

| | | |
|---|---|---|
| EP | 0 974 566 A1 | 1/2000 |
| GB | 2 423 542 A | 8/2006 |
| | (Continued) | |

OTHER PUBLICATIONS

Borger, A., et al., "The ball on three balls test for strength testing of brittle discs: stress distribution in the disc," J. Eur. Ceramic Soc. 22, 2002, 1425-1436.
(Continued)

*Primary Examiner* — Nicole Coy
(74) *Attorney, Agent, or Firm* — Bryan Cave LLP

(57) ABSTRACT

A polycrystalline diamond (PCD) composite compact element 100 comprising a substrate 130, a PCD structure 120 bonded to the substrate 130, and a bond material in the form of a bond layer 140 bonding the PCD structure 120 to the substrate 130; the PCD structure 120 being thermally stable and having a mean Young's modulus of at least about 800 GPa, the PCD structure 120 having an interstitial mean free path of at least about 0.05 microns and at most about 1.5 microns; the standard deviation of the mean free path being at least about 0.05 microns and at most about 1.5 microns. Embodiments of the PCD composite compact element may be for a tool for cutting, milling, grinding, drilling, earth
(Continued)

boring, rock drilling or other abrasive applications, such as the cutting and machining of metal.

21 Claims, 10 Drawing Sheets

Related U.S. Application Data

(60) Provisional application No. 61/230,316, filed on Jul. 31, 2009.

(51) Int. Cl.

| | | |
|---|---|---|
| E21B 10/56 | (2006.01) | |
| B22F 7/00 | (2006.01) | |
| B22F 7/06 | (2006.01) | |
| B23K 1/00 | (2006.01) | |
| B23K 35/00 | (2006.01) | |
| B23K 101/00 | (2006.01) | |
| B24D 99/00 | (2010.01) | |
| C22C 26/00 | (2006.01) | |

(52) U.S. Cl.
CPC .............. *B22F 7/004* (2013.01); *B22F 7/062* (2013.01); *B22F 7/064* (2013.01); *B23K 1/0008* (2013.01); *B23K 35/00* (2013.01); *B23K 2201/002* (2013.01); *B24D 99/005* (2013.01); *C22C 26/00* (2013.01); *C22C 2204/00* (2013.01); *E21B 2010/561* (2013.01); *E21B 2010/564* (2013.01); *Y10T 428/249967* (2015.04); *Y10T 428/30* (2015.01)

(56) References Cited

U.S. PATENT DOCUMENTS

| | | | |
|---|---|---|---|
| 4,850,523 A | 7/1989 | Slutz | |
| 4,943,488 A | 7/1990 | Sung et al. | |
| 5,011,514 A * | 4/1991 | Cho | B01J 3/062 |
| | | | 51/293 |
| 5,028,177 A | 7/1991 | Meskin et al. | |
| 5,079,102 A | 1/1992 | Tanaka et al. | |
| 5,366,522 A * | 11/1994 | Nakamura | B23B 27/145 |
| | | | 428/699 |
| 5,500,248 A | 3/1996 | Iacovangelo et al. | |
| 5,529,805 A | 6/1996 | Iacovangelo et al. | |
| 5,647,878 A | 7/1997 | Iacovangelo et al. | |
| 5,738,698 A | 4/1998 | Kapoor et al. | |
| 6,054,693 A | 4/2000 | Barmatz et al. | |
| 6,209,185 B1 * | 4/2001 | Scott | E21B 10/22 |
| | | | 277/404 |
| 7,234,550 B2 | 6/2007 | Azar et al. | |
| 7,377,341 B2 | 5/2008 | Middlemiss et al. | |
| 7,426,696 B1 | 9/2008 | Hwang et al. | |
| 7,435,377 B2 | 10/2008 | Cho et al. | |
| 7,487,849 B2 | 2/2009 | Radtke | |
| 7,533,740 B2 | 5/2009 | Zhang et al. | |
| 8,763,730 B2 * | 7/2014 | Cariveau | B22F 7/08 |
| | | | 175/425 |
| 2002/0077054 A1 | 6/2002 | Sung | |
| 2005/0230155 A1 | 10/2005 | Sung | |
| 2006/0254830 A1 | 11/2006 | Radtke | |
| 2007/0131459 A1 | 6/2007 | Voronin et al. | |
| 2008/0085407 A1 | 4/2008 | Cooley et al. | |
| 2008/0142657 A1 | 6/2008 | Ammer et al. | |
| 2008/0230280 A1 | 9/2008 | Keshavan et al. | |
| 2009/0173547 A1 | 7/2009 | Voronin et al. | |
| 2010/0300764 A1 * | 12/2010 | Naidoo | B24D 99/005 |
| | | | 175/426 |

FOREIGN PATENT DOCUMENTS

| | | |
|---|---|---|
| WO | 99/29465 A1 | 6/1999 |
| WO | 2006/032984 A2 | 3/2006 |
| WO | 2007/020518 A1 | 2/2007 |
| WO | 2007/110770 A2 | 10/2007 |
| WO | 2009/027948 A1 | 3/2009 |
| WO | 2009/027949 A1 | 3/2009 |

OTHER PUBLICATIONS

German, R.M., "The Contiguity of Liquid Phase Sintered Microstructures," Metallurgical Transactions A, 16A, Jul. 1985, 1247-1252.

Lammer, A., "Mechanical properties of polycrystalline diamonds," Mater. Sci. and Technol., 4, 1988, 949-955.

Miess, D., et al., "Fracture toughness and thermal resistance of polysrystalline diamond compacts," Mat. Sci. and Eng., A209, 1996, 270-276.

Paggett, J.W., et al., "Residual stress and stress gradients in polycrystalline diamond compacts," Inter. J. of Refractory Metals and Hard Materials, 20:3, May 2002, 187-194.

Prabharkara, H.R., "Vacuum brazing of ceramics and graphite to metals," Bangalore Plasmatek Pvt. Ltd., Bangalore.

Underwood, E.E., "Quantitative Stereography," Addison-Wesley, Reading, MA 1970.

* cited by examiner

POLYCRYSTALLINE DIAMOND COMPOSITE COMPACT ELEMENTS AND TOOLS INCORPORATING SAME

This application claims the benefit of U.S. Provisional Application No. 61/230,316, filed Jul. 31, 2009, which is incorporated herein by reference in its entirety.

FIELD

Embodiments of the invention relate to polycrystalline diamond (PCD) composite compact elements comprising a PCD structure, particularly but not exclusively for a rock boring tool, and to tools comprising the elements.

BACKGROUND

Polycrystalline diamond (PCD) is a super-hard, also known as superabrasive material comprising a mass of inter-grown diamond grains and interstices between the diamond grains. PCD may be made by subjecting an aggregated mass of diamond grains to an ultra-high pressure and temperature. A material wholly or partly filling the interstices may be referred to as filler material. PCD may be formed in the presence of a sintering aid such as cobalt, which is capable of promoting the inter-growth of diamond grains. The sintering aid may be referred to as a solvent/catalyst material for diamond, owing to its function of dissolving diamond to some extent and catalyst its re-precipitation. A solvent/catalyst for diamond is understood be a material that is capable of promoting the growth of diamond or the direct diamond-to-diamond inter-growth between diamond grains at a pressure and temperature condition at which diamond is thermodynamically stable. Consequently the interstices within the sintered PCD product may be wholly or partially filled with residual solvent/catalyst material. PCD may be formed on a cobalt-cemented tungsten carbide substrate, which may provide a source of cobalt solvent/catalyst for the PCD.

PCD may be used in a wide variety of tools for cutting, machining, drilling or degrading hard or abrasive materials such as rock, metal, ceramics, composites and wood-containing materials. For example, PCD elements may be used as cutting elements on drill bits used for boring into the earth in the oil and gas drilling industry. In many of these applications the temperature of the PCD material may become elevated as it engages a rock formation, workpiece or body with high energy. Unfortunately, mechanical properties of PCD such as hardness and strength tend to deteriorate at high temperatures, largely as a result of residual solvent/catalyst material dispersed within it.

PCT patent publication number WO9929465 discusses that drilling hard rock and dealing with high well bore temperature gradients have been persistent problems in the drilling industry. The then current state-of-the-art TSP diamond cutter attachment procedure is to braze thermally stable polycrystalline diamond (TSP diamond) to carbide substrates. However, TSP brazing methods using TiCuSil alloy result in an undesirable discontinuous layer of TiC adjacent to the TSP diamond surface. Maximum strength properties are not realized unless a thin continuous layer of reaction product forms on the TSP surface (i.e. unless wetting is complete).

U.S. Pat. No. 7,377,341 discusses that a PCD body that is substantially free of the solvent catalyst material is precluded from subsequent attachment to a metallic substrate by brazing or other similar bonding operation. The attachment of such substrates to the PCD body is highly desired to provide a PCD compact element that can be readily adapted for use in many desirable applications. However, it is very difficult to bond the thermally stable PCD body to conventionally used substrates. Since conventionally formed thermally stable PCD bodies are devoid of a metallic substrate, they cannot be attached to a drill bit by conventional brazing process. Rather, the use of such a thermally stable PCD body in drilling application requires that the PCD body itself be mounted to the drill bit by mechanical or interference fit during manufacturing of the drill bit, which is labour intensive, time consuming, and which does not provide a most secure method of attachment.

U.S. Pat. No. 7,435,377 discusses that polycrystalline diamond (PCD) and other ultra-hard materials may be joined to a supporting mass by means of brazing. However, a disadvantage of brazing is relates to concerns over potential heat damage of the PCD product, which has been a limiting factor in the past.

U.S. Pat. No. 7,487,849 discusses that because TSP (thermally stable product) is made by removing cobalt from a diamond layer, attachment of TSP to a substrate is significantly more complicated, as compared to the attachment of PDC to a substrate.

U.S. Pat. No. 7,533,740 discloses a cutting element comprising TSP material bonded to a tungsten carbide substrate by brazing (this patent uses the term "TSP" as described in U.S. Pat. Nos. 7,234,550 and 7,426,696, which use the term "TSP" to mean "thermally stable product", including both partially and completely leached polycrystalline diamond compounds).

United States patent publication number 2008/0085407 discloses a super-abrasive compact element wherein a super-abrasive volume including a tungsten carbide layer may be brazed, soldered, welded (including frictional or inertial welding), or otherwise affixed to a substrate.

There is a need for PCD composite compact elements, particularly thermally stable PCD elements, having superior mechanical properties.

SUMMARY

An embodiment of the invention provides a polycrystalline diamond (PCD) composite compact element comprising a substrate, a PCD structure bonded to the substrate, and a bond material bonding the PCD structure to the substrate; the PCD structure being thermally stable and having a mean Young's modulus of at least about 800 GPa, at least about 850 GPa, or at least 870 GPa, the PCD structure having an interstitial mean free path of at least about 0.05 microns and at most about 1.5 microns; the standard deviation of the mean free path being at least about 0.05 microns and at most about 1.5 microns.

An embodiment of the invention provides a PCD composite compact element comprising a PCD structure bonded to a substrate by means of a bond material; the PCD structure being thermally stable and having a mean Young's modulus of at least about 800 GPa, at least about 850 GPa, or at least 870 GPa, and a mean diamond grain contiguity greater than about 60 percent or greater than 60.5 percent.

In one embodiment of the invention, the bond material may comprise an epoxy material for joining ceramic materials.

In one embodiment of the invention, the PCD structure may be brazed to the substrate, the bond material being a braze alloy in the form of a braze layer between the PCD structure and the substrate.

In one embodiment of the invention, the braze alloy may have a melting onset temperature, at which the alloy begins to melt, of at most about 1,050 degrees centigrade, at most about 950 degrees centigrade, at most about 900 degrees centigrade or even at most about 850 degrees centigrade, and may contain at least one element selected from the group consisting of Ti, V, Cr, Mn, Zr, Nb, Mo, Hf, Ta, W and Re. In some embodiments, the braze alloy may contain Ti and Ag, or Ti and Cu.

An embodiment of the invention provides a PCD composite compact element comprising a PCD structure bonded to a substrate by means of a braze layer comprising braze material; the PCD structure being thermally stable and containing braze material.

In some embodiments of the invention, the PCD structure may contain braze alloy material within pores, crevices or irregularities formed at a boundary of the PCD structure. In one embodiment, pores, crevices or irregularities may formed at a boundary of the PCD structure by removing filler material from between diamond grains, such as by means of acid treatment.

In some embodiments of the invention, the PCD structure may have a mean Young's modulus of at least about 800 GPa, at least about 850 GPa, or at least about 870 GPa.

In one embodiment of the invention, the PCD structure may contain braze alloy material to a depth of at least about 2 microns from an interface or boundary, such as an interface with the braze layer or with the substrate. In some embodiments of the invention, the PCD structure may contain braze material to a depth from an interface with the braze layer, the depth being in the range from about 2 microns to about 1,000 microns, in the range from about 2 microns to about 25 micron, or in the range from about 5 microns to about 15 microns. In one embodiment, the PCD structure may contain braze material substantially throughout the whole of the PCD structure.

In some embodiments of the invention, the PCD structure may have an interstitial mean free path in the range from about 0.05 micron to about 1.3 microns, in the range from about 0.1 micron to about 1 micron, or in the range from about 0.5 micrometers to about 1 micron; and the standard deviation of the mean free path may be in the range from about 0.05 micron to about 1.5 microns, or in the range from about 0.2 micron to about 1 micron.

In some embodiments of the invention, the PCD structure may have a mean diamond grain contiguity of at least about 60 percent, in the range from 60.5 percent to about 80 percent, in the range from 60.5 percent to about 77 percent, or in the range from 61.5 percent to about 77 percent. In one embodiment of the invention, the PCD structure may have a mean diamond grain contiguity of at most about 80 percent.

In some embodiments of the invention, the PCD structure may have a transverse rupture strength of at least about 900 MPa, at least about 950 MPa, at least about 1,000 MPa, at least about 1,050 MPa, or even at least about 1,100 MPa.

In some embodiments of the invention, the substrate may be formed of cemented carbide, such as cobalt-cemented tungsten carbide, or the substrate may comprise PCD material, or the substrate may be a composite compact element comprising cemented carbide and PCD material. In one embodiment of the invention, the PCD structure may be brazed to a further PCD structure, and in one embodiment, the PCD structure may be more thermally stable than the further PCD structure.

In some embodiments of the invention, the substrate may include superhard particles such as diamond particles dispersed within it. In one embodiment, the substrate may include diamond particles, the content of which may be in the range from about 20 volume percent to about 60 volume percent.

In some embodiments of the invention, the PCD structure may exhibit no substantial structural degradation or deterioration of hardness or abrasion resistance after exposure to a temperature above about 400 degrees centigrade or in the range from about 750 degrees centigrade to about 800 degrees centigrade, or even in the range from about 760 degrees centigrade to about 810 degrees centigrade.

In one embodiment, the PCD structure may be substantially free of material capable of functioning as solvent/catalyst for diamond. In some embodiments, there may be less than about 5 volume percent, less than about 2 volume percent, less than about 1 volume percent or less than about 0.5 volume percent of solvent/catalyst for diamond in the PCD structure. In some embodiments, the PCD structure may be at least partially porous, or substantially the entire PCD structure may be porous.

In some embodiments of the invention, the PCD structure may have an oxidation onset temperature of at least about 800 degrees centigrade, at least about 900 degrees centigrade or even at least about 950 degree centigrade.

In some embodiments of the invention, the PCD structure may not be substantially entirely porous and may have a mean Young's modulus of at least about 900 GPa, at least about 950 GPa, at least about 1,000 GPa; and the transverse rupture strength is at least about 1,000 MPa, at least about 1,100 Mpa, at least about 1,400 MPa, at least about 1,500 MPa, or even at least about 1,600 MPa.

In one embodiment of the invention, PCD structure may include a filler material comprising a ternary carbide of the general formula: Mx M'y Cz wherein; M is at least one metal selected from the group consisting of the transition metals and the rare earth metals; M' is a metal selected from the group consisting of the main group metals or metalloid elements and the transition metals Zn and Cd; x is from 2.5 to 5.0; y is from 0.5 to 3.0; and z is from 0.1 to 1.2.

In some embodiments, the PCD structure may include a filler material comprising a tin-based inter-metallic or ternary carbide compound formed with a metallic solvent/catalyst for diamond. In one embodiment, the metallic solvent/catalyst material for diamond may comprise cobalt.

In one embodiment of the invention, the shear strength of the bond between the PCD structure and the substrate may be greater than about 100 MPa. In some embodiments, the shear strength of the bond between the PCD structure and the substrate may be in the range from about 100 MPa to about 500 MPa, in the range from about 100 MPa to about 300 MPa, or in the range from about 200 MPa to about 300 MPa.

In some embodiments of the invention, the PCD structure may comprise at least about 90 volume percent inter-bonded diamond grains having a mean size in the range from about 0.1 microns to 25 microns, in the range from about 0.1 micron to 20 microns, in the range from about 0.1 micron to about 15 microns, in the range from about 0.1 microns to about 10 microns, or in the range from about 0.1 micron to about 7 micron. In one embodiment, the PCD structure may comprise a diamond content in the range from about 90 to about 99 volume percent of the PCD structure, and in one embodiment, the PCD structure may comprise at least 92 volume percent diamond.

In one embodiment of the invention, the PCD structure may comprise diamond grains having a multi-modal size distribution. In some embodiments, the PCD structure may comprise bonded diamond grains having the size distribution characteristic that at least about 50 percent of the grains have mean size greater than about 5 microns, and at least about 20 percent of the grains have mean size in the range from about 10 to about 15 microns.

In some embodiments of the invention, the PCD structure may be made by a method including forming a plurality of diamond grains into an aggregated mass and sintering them in the presence of a solvent/catalyst material for diamond, the sintering including subjecting the aggregated mass and the solvent/catalyst material to a temperature sufficiently high for the solvent/catalyst to melt and to a pressure of greater than 6.0 GPa, at least 6.2 GPa, at least about 6.5 GPa, at least about 7 GPa or at least about 8 GPa.

In some embodiments of the invention, the PCD structure may comprise at least two portions, each portion being formed of PCD material having different microstructure, composition or diamond particle size distribution, or combination of these, and different properties, such as strength or Young's modulus. In some embodiments, at least one portion may comprise diamond particles having a multi-modal size distribution with mean particle size in the range from about 5 microns to about 20 microns, or in the range from about 5 microns to 15 about microns.

In one embodiment of the invention, the PCD composite compact element may be suitable for a drill bit for boring into the earth, such as a rotary shear-cutting bit for use in the oil and gas drilling industry. In one embodiment, the PCD composite compact element may comprise a cutting element for a rolling cone, hole opening tool, expandable tool, reamer or other earth boring tools.

An embodiment of the invention provides a polycrystalline diamond (PCD) composite compact element, comprising a PCD structure bonded to a substrate; the PCD structure being substantially free of material capable of functioning as solvent/catalyst for diamond and having a mean Young's modulus of at least about 800 GPa, at least about 850 GPa, or at least about 870 GPa.

An embodiment of the invention provides a tool comprising an embodiment of a PCD composite compact element according to the invention, the tool being for cutting, milling, grinding, drilling, earth boring, rock drilling or other abrasive applications, such as the cutting and machining of metal.

A method of making an embodiment of a PCD composite compact element according to the invention is provided, the method including providing a PCD structure, treating the PCD structure to remove filler material from between diamond grains and create pores, crevices or irregularities at a boundary of the PCD structure; and brazing the PCD structure to a substrate at the boundary. The method is an aspect of the invention.

In one version of the method, pores, crevices or irregularities may be formed on a surface of the PCD structure by means of treating the PCD structure with acid. In one embodiment, the pores, crevices or irregularities may have a mean size substantially the same as the mean size of the interstices between the diamond grains, and in some embodiments, the mean size may be at least about 2 microns or at least about 5 microns, and at most about 10 microns.

DRAWINGS

Non-limiting embodiments will now be described with reference to the accompanying drawings of which:

The same reference numbers refer to the same features in all drawings.

DETAILED DESCRIPTION OF EMBODIMENTS

As used herein, a "catalyst material for diamond", also referred to as "solvent/catalyst for diamond", is a material that is capable of promoting the nucleation, growth or inter-bonding of diamond grains at a pressure and temperature at which diamond is thermodynamically stable. Catalyst materials for diamond may be metallic, such as cobalt, iron, nickel, manganese and alloys of these, or non-metallic.

As used herein, "polycrystalline diamond" (PCD) material comprises a mass of diamond grains, a substantial portion of which are directly inter-bonded with each other and in which the content of diamond is at least about 80 volume percent of the material. In one embodiment of PCD material, interstices between the diamond gains may be at least partly filled with a binder material comprising a catalyst for diamond. As used herein, "interstices" or "interstitial regions" are regions between the diamond grains of PCD material. In embodiments of PCD material, interstices or interstitial regions may be substantially or partially filled with a material other than diamond, or they may be substantially empty. As used herein, a "filler" material is a material that wholly or partially fills pores, interstices or interstitial regions within a structure, such as a polycrystalline structure. Thermally stable embodiments of PCD material may comprise at least a region from which catalyst material has been removed from the interstices, leaving interstitial voids between the diamond grains. As used herein, a "thermally stable PCD" structure is a PCD structure at least a part of which exhibits no substantial structural degradation or deterioration of hardness or abrasion resistance after exposure to a temperature above about 400 degrees centigrade.

Figure 1A:
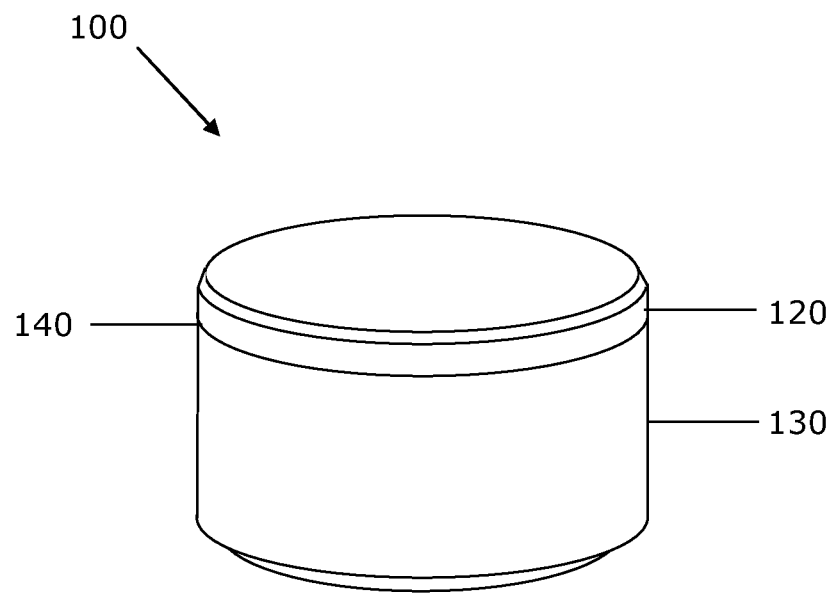
FIG. 1A shows a schematic perspective view of an embodiment of a PCD composite compact element.
Figure 1B:
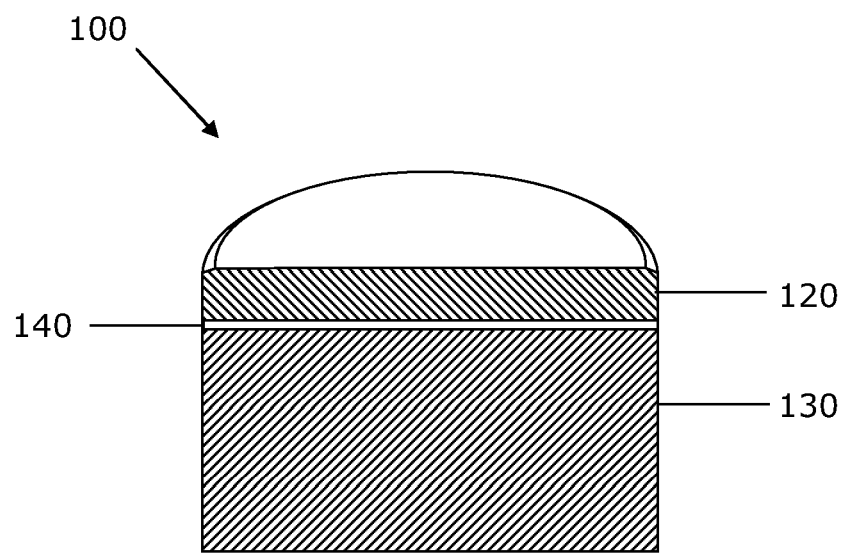
FIG. 1B shows schematic longitudinal cross-section view of the embodiment of the PCD composite compact element shown in FIG. 1A.

With reference to FIG. 1A and FIG. 1B, an embodiment of a PCD composite compact element 100 may comprise a thermally stable PCD structure 120 bonded to the substrate 130 by means of a bond material in the form of a bond layer 140 between the PCD structure 120 and the substrate 130. In one version of the embodiment, the PCD structure 120 may be substantially free of material capable of functioning as solvent/catalyst for diamond. In another version of the embodiment, the PCD structure 120 may include non-metallic solvent/catalyst for diamond.

Figure 2:
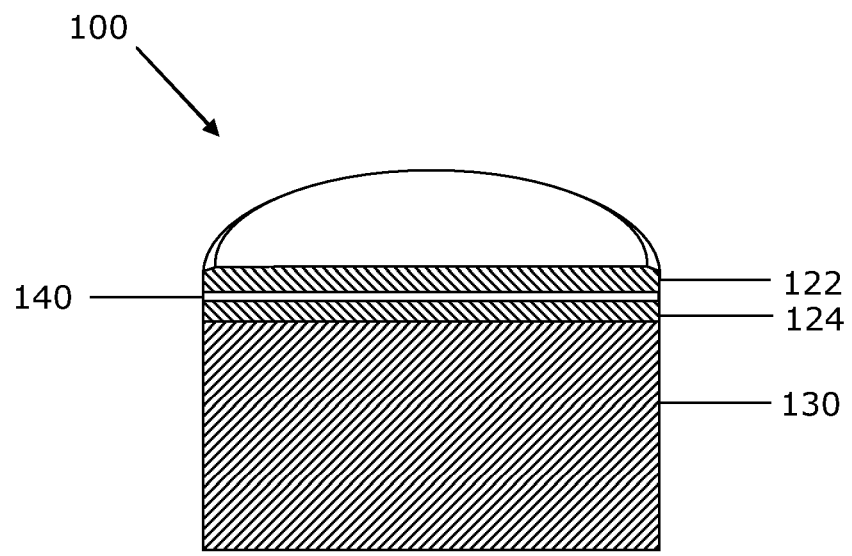
FIG. 2, FIG. 3, FIG. 4, FIG. 5 and FIG. 6 show drawings of schematic longitudinal cross-section views of embodiments of PCD composite compact elements.

With reference to FIG. 2, an embodiment of a PCD composite compact element 100 may comprise a first PCD structure 122 bonded to a second PCD structure 124 by means of a bond material in the form of a bond layer 140 between the first PCD structure 122 and the second PCD structure 124. The first PCD structure 122 may be more thermally stable than the second PCD structure 124. The second PCD structure 124 may be integrally bonded to a cemented carbide substrate 130.

Figure 3:
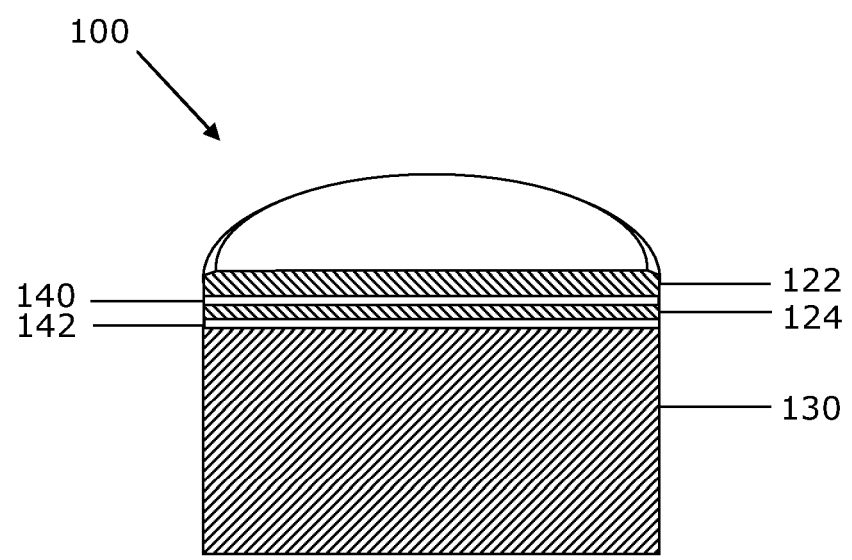

With reference to FIG. 3, an embodiment of a PCD composite compact element 100 may comprise a first PCD structure 122 bonded to a second PCD structure 124 by means of a bond material in the form of a bond layer 140 between the first PCD structure 122 and the second PCD structure 124. The second PCD structure 124 may be bonded by means of a bond material in the form of a bond layer 142 between the second PCD structure 124 and the substrate 140.

Figure 4:
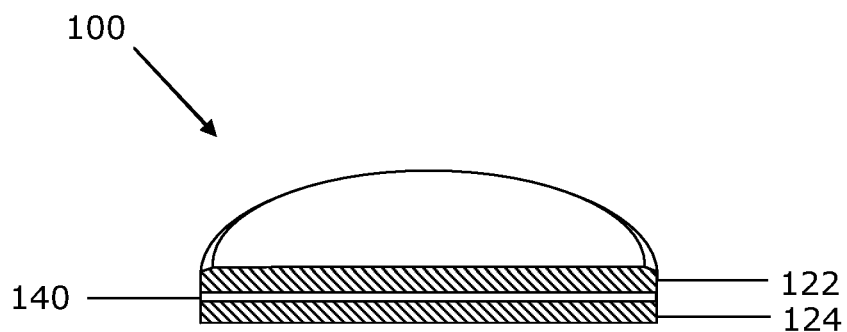

With reference to FIG. 4, an embodiment of a PCD composite compact element 100 may comprise a first PCD structure 122 bonded to a second PCD structure 124 by means of a bond material in the form of a bond layer 140 between the first PCD structure 122 and the second PCD structure 124. The second PCD structure 124 may not be bonded or otherwise joined to a cemented carbide substrate.

Figure 5:
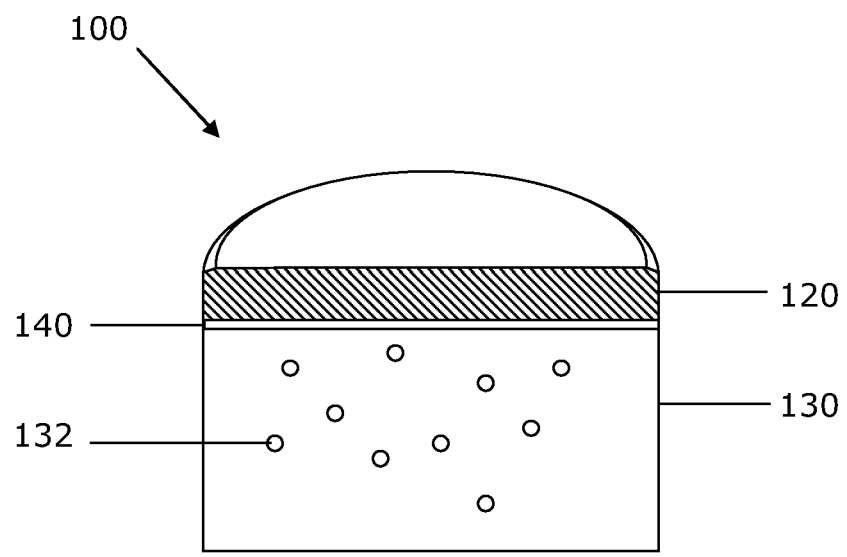

With reference to FIG. 5, an embodiment of a PCD composite compact element 100 may comprise a PCD structure 120 bonded to the substrate 130 by means of a bond material in the form of a bond layer 140, and the substrate 130 may include diamond particles 132 dispersed within it.

"Young's modulus" is a type of elastic modulus and is a measure of the uniaxial strain in response to a uniaxial stress, within the range of stress for which the material behaves elastically. A preferred method of measuring the Young's modulus E is by means of measuring the transverse and longitudinal components of the speed of sound through the material, according to the equation $E=2\rho \cdot C_T^2(1+v)$, where $v=(1-2\ (C_T/C_L)^2)/(2-2\ (C_T/C_L)^2)$, $C_L$ and $C_T$ are respectively the measured longitudinal and transverse speeds of sound through it and $\rho$ is the density of the material. The longitudinal and transverse speeds of sound may be measured using ultrasonic waves, as is well known in the art. Where a material is a composite of different materials, the mean Young's modulus may be estimated by means of one of three formulas, namely the harmonic, geometric and rule of mixtures formulas as follows: $E=1/(f_1/E_1+f_2/E_2)$; $E=E_1^{f_1}+E_1^{f_2}$; and $E=f_1E_1+f_2E_2$; in which the different materials are divided into two portions with respective volume fractions of $f_1$ and $f_2$, which sum to one.

Figure 6:
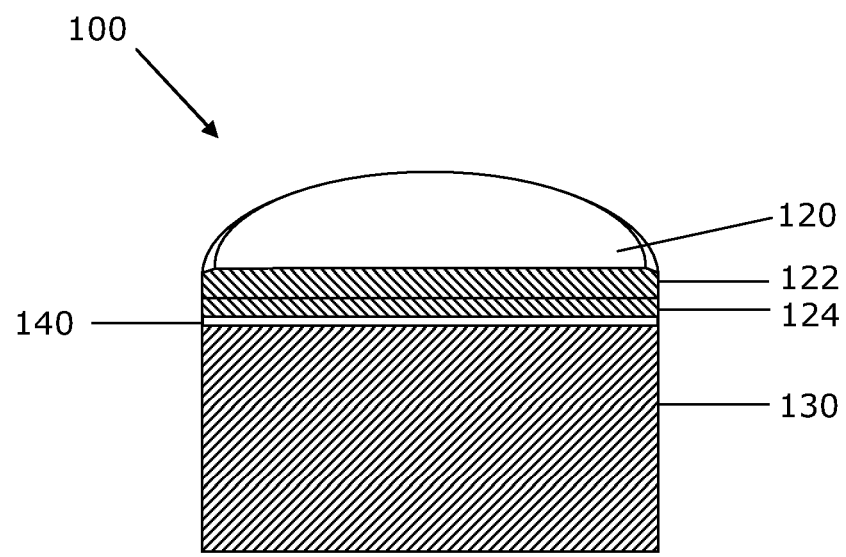

With reference to FIG. 6, an embodiment of a PCD composite compact element 100 may comprise a PCD structure 120 bonded to a cemented carbide substrate 130 by means of a bond material in the form of a bond layer 140, in which the PCD structure 120 may comprise a first portion 122 integrally formed with a second portion 124 and the first and second portions may have different microstructure, composition or diamond particle size distribution, or combination of these, and different properties, such as strength or Young's modulus.

In the embodiments described with reference to FIG. 1A, FIG. 1B, FIG. 2, FIG. 3, FIG. 4, FIG. 5 and FIG. 6, the bond material may comprise or consist of a braze alloy material and the bond layer 140 may be a braze layer. In one embodiment, the bond material may comprise or consist of an epoxy material for bonding or joining ceramic materials.

Figure 7:
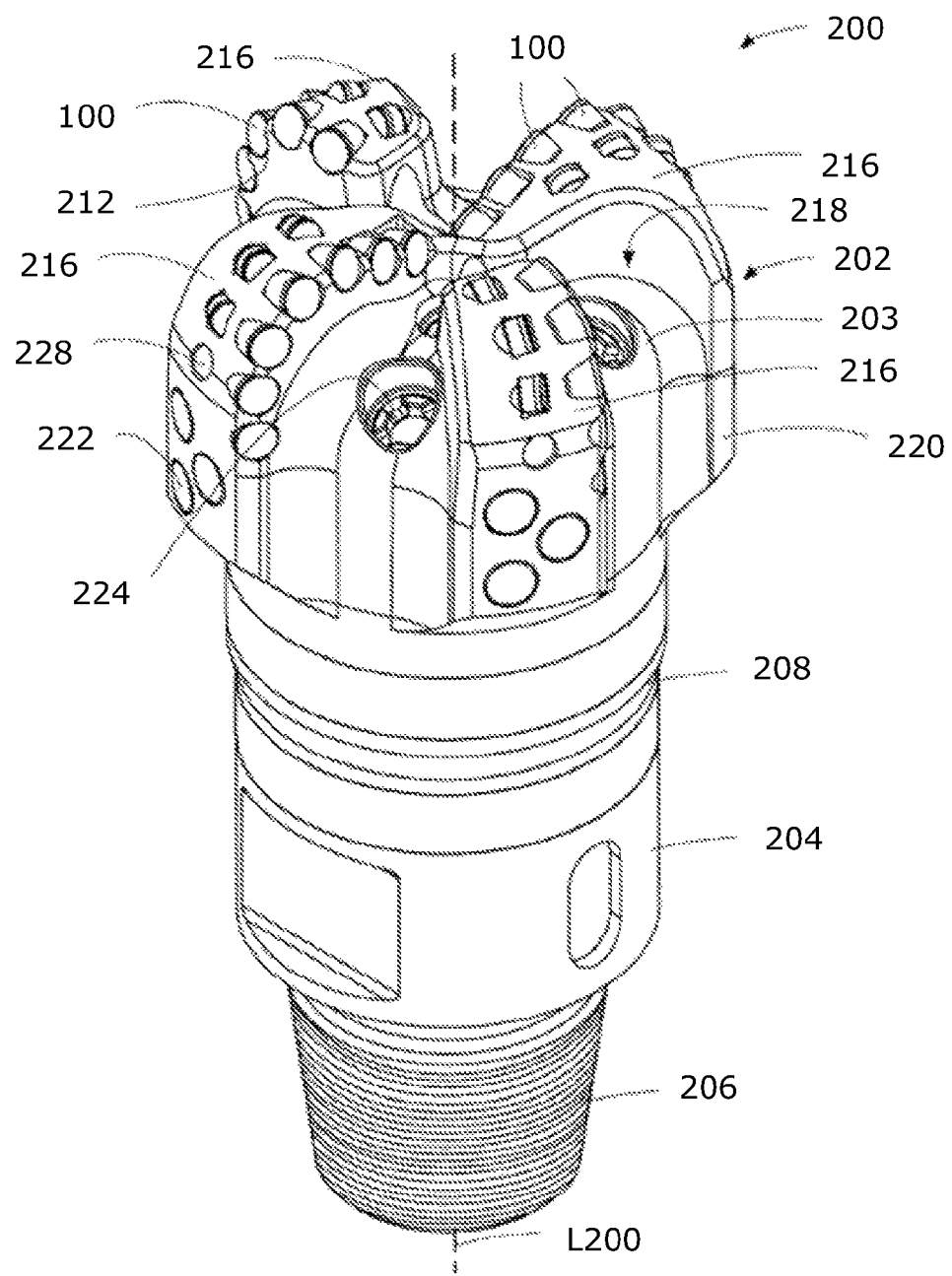
FIG. 7 shows a perspective view of a rotary drill bit for boring into the earth.

With reference to FIG. 7, an embodiment of an earth-boring rotary drill bit 200 of the present invention includes, for example, a plurality of cutting elements 100 as previously described herein with reference to FIG. 1. The earth-boring rotary drill bit 200 includes a bit body 202 that is secured to a shank 204 having a threaded connection portion 206 (e.g., a threaded connection portion 206 conforming to industry standards such as those promulgated by the American Petroleum Institute (API)) for attaching the drill bit 200 to a drill string (not shown). The bit body 202 may comprise a particle-matrix composite material or a metal alloy such as steel. The bit body 202, may be secured to the shank 204 by one or more of a threaded connection, a weld, and a braze alloy at the interface between them. In some embodiments, the bit body 202 may be secured to the shank 204 indirectly by way of a metal blank or extension between them, as known in the art.

The bit body 202 may include internal fluid passageways (not shown) that extend between the face 203 of the bit body 202 and a longitudinal bore (not shown), which extends through the shank 204 the extension 208 and partially through the bit body 202. Nozzle inserts 224 also may be provided at the face 203 of the bit body 202 within the internal fluid passageways. The bit body 202 may further include a plurality of blades 216 that are separated by junk slots 218. In some embodiments, the bit body 202 may include gage wear plugs 222 and wear knots 228. A plurality of PDC cutting elements 100 of one or more of embodiments as previously described herein may be mounted on the face 203 of the bit body 202 in cutting element pockets 212 that are located along each of the blades 216. In other embodiments, PDC cutting elements 100 as previously described with reference to FIG. 1, FIG. 2, FIG. 3, FIG. 4, FIG. 5, FIG. 6 or any other embodiment of a PDC cutting element of the present invention, may be provided in the cutting element pockets 212.

The cutting elements 100 are positioned to cut a subterranean formation being drilled while the drill bit 200 is rotated under weight on bit (WOB) in a bore hole about centreline L200.

In the field of quantitative stereography, particularly as applied to cemented carbide material, "contiguity" is understood to be a quantitative measure of inter-phase contact. It is defined as the internal surface area of a phase shared with grains of the same phase in a substantially two-phase microstructure (Underwood, E. E, "*Quantitative Stereography*", Addison-Wesley, Reading Mass. 1970; German, R. M. "*The Contiguity of Liquid Phase Sintered Microstructures*", Metallurgical Transactions A, Vol. 16A, July 1985, pp. 1247-1252). As used herein, "diamond grain contiguity" K is a measure of diamond-to-diamond contact or bonding, or a combination of contact and bonding within PCD material, and is calculated according to the following formula using data obtained from image analysis of a polished section of PCD material:

$$\kappa=100*[2*(\delta-\beta)]/[(2*(\delta-\beta))+\delta],$$

where $\delta$ is the diamond perimeter, and $\beta$ is the binder perimeter.

As used herein, the "diamond perimeter" is the fraction of diamond grain surface that is in contact with other diamond grains. It is measured for a given volume as the total diamond-to-diamond contact area divided by the total diamond grain surface area. The binder perimeter is the fraction of diamond grain surface that is not in contact with other diamond grains. In practice, measurement of contiguity is carried out by means of image analysis of a polished section surface. The combined lengths of lines passing through all points lying on all diamond-to-diamond interfaces within the analysed section are summed to determine the diamond perimeter, and analogously for the binder perimeter.

Figure 8:
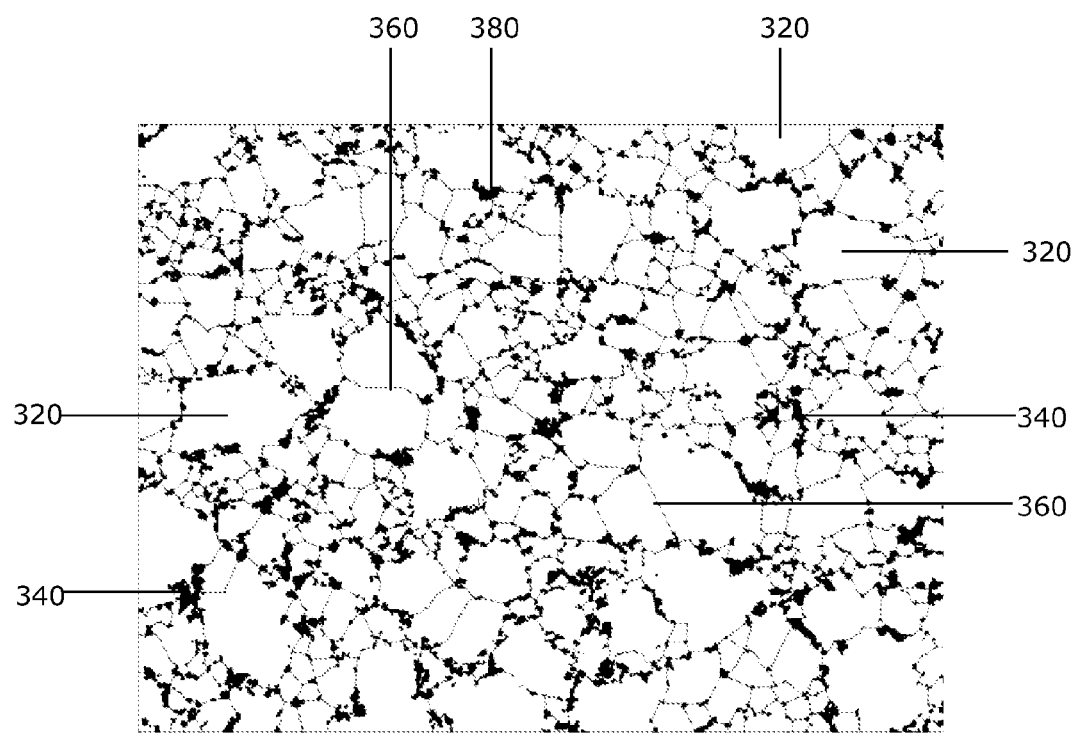
FIG. 8 shows an image of a PCD polished section, showing calculated lines indicating diamond-to-diamond contact.

FIG. 8 shows an example of a processed SEM image of a polished section of a PCD structure, showing the boundaries 360 between diamond grains 320. These boundary lines 360 were calculated by the image analysis software and were used to measure the diamond perimeter and subsequently for calculating the diamond grain contiguity. The non-diamond regions 340, which may be filled interstices or voids, for example, are indicated as dark areas. The binder perimeter was obtained from the cumulative length of the boundaries 360 between the diamond 320 and the non-diamond or interstitial regions 340.

Figure 9:
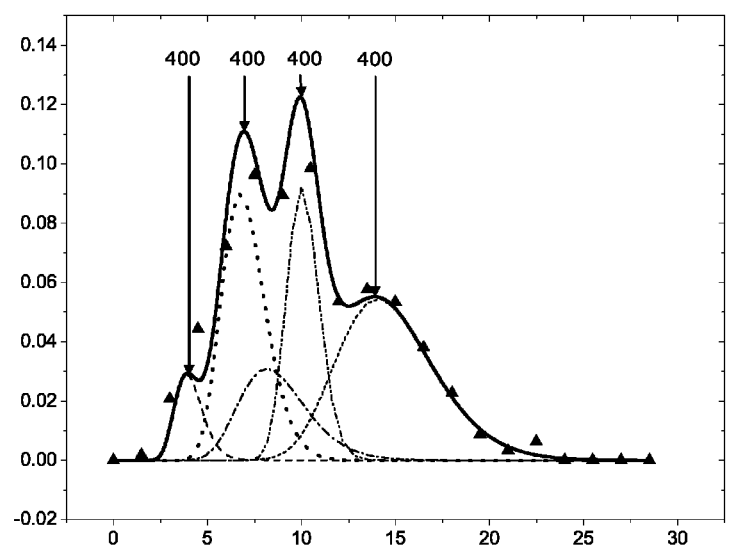
FIG. 9, FIG. 10 and FIG. 11 show graphs of number of grains versus grain size for examples of multimodal size distributions of the diamond grains within embodiments of polycrystalline diamond structures.
Figure 10:
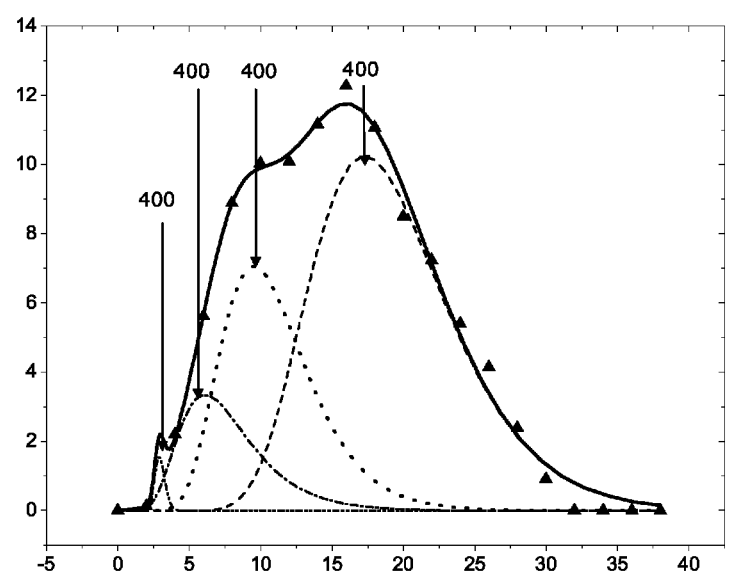
Figure 11:
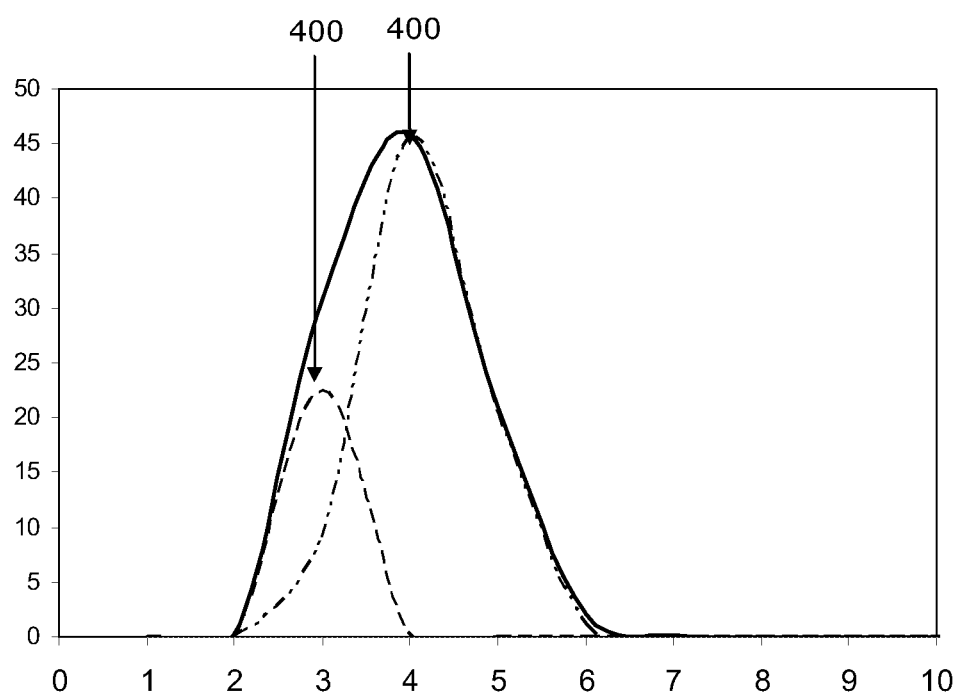

FIG. 9, FIG. 10 and FIG. 11 show non-limiting examples of multimodal grain size distributions of diamond grains within embodiments of PCD structures, for the purpose of illustration. As used herein, a "multimodal" size distribution of a mass of grains is understood to mean that the grains have a size distribution with more than one peak 400, each peak 400 corresponding to a respective "mode". Multimodal polycrystalline bodies may be made by providing more than one source of a plurality of grains, each source comprising grains having a substantially different average size, and blending together the grains or grains from the sources. Measurement of the size distribution of the blended grains may reveal distinct peaks corresponding to distinct modes. When the grains are sintered together to form the polycrystalline body, their size distribution may be further altered as the grains are compacted against one another and fractured, resulting in the overall decrease in the sizes of the grains. Nevertheless, the multimodality of the grains may still be clearly evident from image analysis of the sintered article.

The size of grains is expressed in terms of equivalent circle diameter (ECD). As used herein, the "equivalent circle diameter" (ECD) of a particle is the diameter of a circle having the same area as a cross section through the particle. The ECD size distribution and mean size of a plurality of particles may be measured for individual, unbonded particles or for particles bonded together within a body, by means of image analysis of a cross-section through or a surface of the body. Unless otherwise stated herein, dimensions of size, distance, perimeter, ECD, mean free path and so forth relating to grains and interstices within PCD material, as well as the grain contiguity, refer to the dimensions as measured on a surface of, or a section through a body comprising PCD material and no stereographic correction has been applied. For example, the size distributions of the diamond grains as shown in FIG. 9, FIG. 10 and FIG. 11 were measured by means of image analysis carried out on a polished surface, and a Saltykov correction was not applied.

In one embodiment of the invention, the PCD structure may comprise a first portion formed of a PCD material comprising diamond grains having at least three modes in the multimodal size distribution as shown in FIG. 9, and a second portion formed of a PCD material comprising diamond grains having at least four-modes multimodal size distribution as shown in FIG. 10, the mean size of the grains in the first portion being substantially less than that in the second portion, and the first and second portions of the PCD structure being integrally formed with each other. The PCD structure may be brazed to the substrate with the second portion of the PCD structure proximate the substrate and the first portion of the PCD structure remote from the substrate.

In one embodiment of the invention, the PCD structure may comprise a first portion formed a PCD material comprising diamond grains having two modes in the multimodal size distribution as shown in FIG. 11, and a second portion formed of a PCD material comprising diamond grains having at least three modes in the multimodal size distribution as shown in FIG. 9, the first and second portions of the PCD structure being integrally formed with each other.

The PCD structure may be brazed to the substrate with the second portion of the PCD structure proximate the substrate and the first portion of the PCD structure remote from the substrate.

In some embodiments, the PCD structure may be as taught in PCT publication number WO2009/027948, which discloses a PCD structure comprising a diamond phase and a filler material, the filler material comprising a ternary carbide of the general formula: $M_x M'_y C_z$ wherein; M is at least one metal selected from the group consisting of the transition metals and the rare earth metals; M' is a metal selected from the group consisting of the main group metals or metalloid elements and the transition metals Zn and Cd; x is from 2.5 to 5.0; y is from 0.5 to 3.0; and z is from 0.1 to 1.2.

In some embodiments, the PCD structure may be as taught in PCT publication number WO2009/027949, which discloses PCD composite material comprising inter-grown diamond grains and a filler material, the filler material comprising a tin-based inter-metallic or ternary carbide compound formed with a metallic solvent/catalyst. The use of CoSn may facilitate PCD sintering at high-pressure high temperature conditions at which the temperature is between about 1,300 and about 1,450 degrees centigrade and the pressure is between about 5.0 and about 5.8 GPa. In some embodiments, substantially all of the cobalt may be removed from the PCD structure prior to brazing the structure to a substrate.

The homogeneity of the microstructure may be characterised in terms of the combination of the mean thickness of the interstices between the diamonds, and the standard deviation of this thickness. The homogeneity or uniformity of a PCD structure may be quantified by conducting a statistical evaluation using a large number of micrographs of polished sections. The distribution of a filler phase or of pores within the PCD structure may be easily distinguishable from that of the diamond phase using electron microscopy and can be measured in a method similar to that disclosed in EP 0 974 566 (see also WO2007/110770). This method allows a statistical evaluation of the average thicknesses or interstices along several arbitrarily drawn lines through the microstructure. The mean binder or interstitial thickness is also referred to as the "mean free path". For two materials of similar overall composition or binder content and average diamond grain size, the material that has the smaller average thickness will tend to be more homogenous, as this indicates a finer scale distribution of the binder in the diamond phase. In addition, the smaller the standard deviation of this measurement, the more homogenous is the structure. A large standard deviation indicates that the binder thickness varies widely over the microstructure and that the structure is not uniform.

As used herein, the "interstitial mean free path" within a polycrystalline material comprising an internal structure including interstices or interstitial regions, such as PCD, is understood to mean the average distance across each interstitial between different points at the interstitial periphery. The average mean free path is determined by averaging the lengths of many lines drawn on a micrograph of a polished sample cross section. The mean free path standard deviation is the standard deviation of these values. The diamond mean free path is defined and measured analogously.

In measuring the mean value and deviation of a quantity such as grain contiguity, or other statistical parameter measured by means of image analysis, several images of different parts of a surface or section are used to enhance the reliability and accuracy of the statistics. The number of images used to measure a given quantity or parameter may be at least about 9 or even up to about 36. The number of images used may be about 16. The resolution of the images needs to be sufficiently high for the inter-grain and inter-phase boundaries to be clearly made out. In the statistical analysis, typically 16 images are taken of different areas on a surface of a body comprising the PCD material, and statistical analyses are carried out on each image as well as across the images. Each image should contain at least about 30 diamond grains, although more grains may permit more reliable and accurate statistical image analysis.

In some embodiments, the PCD structure may be as taught in PCT publication number WO2007/020518, which discloses polycrystalline diamond a polycrystalline diamond abrasive element comprising a fine grained polycrystalline diamond material characterised in that it has an interstitial mean-free-path value of less than 0.60 microns, and a standard deviation for the interstitial mean-free-path that is less than 0.90 microns. In one embodiment, the polycrystalline diamond material may have a mean diamond grain size of from about 0.1 micron to about 10.5 microns.

In some embodiments, the PCD structure may be manufactured using a method including sintering of diamond grains in an ultra-high pressure and temperature (HPHT) process in the presence of a solvent/catalyst material for diamond and then removing solvent/catalyst material from interstices within the PCD structure. Catalyst material may be removed from the PCD table using methods known in the art such as electrolytic etching, acid leaching and evaporation techniques. In some embodiments, a masking or passivating medium may be introduced into pores within the PCD structure.

Solvent/catalyst material may be introduced to an aggregated mass of diamond grains for sintering in various ways known in the art. One way includes depositing metal oxide onto the surfaces of a plurality of diamond grains by means of precipitation from an aqueous solution prior to forming their consolidation into an aggregated mass. Such methods are disclosed in PCT publications numbers WO2006/032984 and also WO2007/110770. Another way includes preparing or providing metal alloy including a catalyst material for diamond, such as cobalt-tin alloy, in powder form and blending the powder with the plurality of diamond grains prior to their consolidation into an aggregated mass. The blending may be carried out by means of a ball mill. Other additives may be blended into the aggregated mass.

In one embodiment, the aggregated mass of diamond grains, including any solvent/catalyst material particles or additive material particles that may have been introduced, may be formed into an unbonded or loosely bonded structure, which may be placed onto a cemented carbide substrate. The cemented carbide substrate may contain a source of catalyst material for diamond, such as cobalt. The assembly of aggregated mass and substrate may be encapsulated in a capsule suitable for an ultra-high pressure furnace apparatus and subjecting the capsule to a pressure of greater than 6 GPa. Various kinds of ultra-high pressure apparatus are known and can be used, including belt, torroidal, cubic and tetragonal multi-anvil systems. The temperature of the capsule should be high enough for the source of catalyst material to melt and low enough to avoid substantial conversion of diamond to graphite. The time should be long enough for sintering to be completed but as short as possible to maximise productivity and reduce costs.

As noted previously, the PCD structure may have an oxidation onset temperature of at least about 800 degrees centigrade. Embodiments of such PCD may have superior thermal stability and exhibit superior performance in applications such as oil and gas drilling, wherein the temperature of a PCD cutter element can reach several hundred degrees centigrade. Oxidation onset temperature is measured by means of thermo-gravimetric analysis (TGA) in the presence of oxygen, as is known in the art.

In some embodiments of the invention, the bond material may comprise a high shear strength epoxy resin or epoxy paste material for joining ceramic materials, for example epoxy paste under the trade name ES550™ from Permabond™, or solder material. In one embodiment, the bond material may comprise or consist of an organic adhesive.

In some embodiments the PCD structure may be brazed to the substrate by means of microwave brazing, wherein the braze material is heated by means of microwave energy. Brazing the PCD using an active braze material in a very high vacuum may result in braze strength high enough for the PCD compact element to be technically and economically viable. Active brazing is discussed by H. R. Prabhakara (in "*Vacuum brazing of ceramics and graphite to metals*", Bangalore Plasmatek Pvt. Ltd, 129, Block—14, Jeevanmitra Colony I-Phase, Bangalore 560 078).

In some embodiments, the braze alloy may have a melting onset temperature, at which the alloy begins to melt, of at most about 1,050 degrees centigrade, at most about 1,000 degrees centigrade or at most about 950 degrees centigrade. Such embodiments may have the advantage of permitting a PCD structure to be brazed to a substrate at a temperature sufficiently low that thermally-induced degradation the PCD may be reduced or avoided. The process of brazing PCD to a substrate may be carried out in a substantially inert atmosphere that inhibits oxidation, which may have the advantage of resulting in a stronger braze bond.

In one embodiment, the braze alloy may comprise an element that readily reacts with carbon to form carbide, and in one embodiment, the braze alloy may be a reactive braze alloy, which may effectively wet the surface of diamond.

In one embodiment, the braze alloy may contain Ti, which may effectively wet the surface of the diamond. In some embodiments, the braze alloy may contain Cu, Ni, Ag or Au, which may effectively wet a cemented carbide substrate. One type of reactive braze alloy may modify the surface of the diamond operative to make it more readily wettable. Examples of this type of reactive braze alloys may comprise Mo, W, Ti, Ta, V and Zr. In some embodiments, the braze alloy may comprise or consist essentially of Ti, Cu and Ag, also referred to as "TiCuSil" braze alloys, which may comprise a eutectic composition of Ag and Cu, as well as an amount of Ti. For example, the weight ratio of Ti to Cu to Ag may be 4.5:26.7:68.8, or the ratio of Ti to Cu to Ag may be 10.0:25.4:64.6, or the ratio of Ti to Cu to Ag may be 15.0:24.0:61.0. In one embodiment, the braze alloy may comprise about 63.00% Ag, about 32.25% Cu and about 1.75% Ti, and may be available under the trade name of Cusil™ ABA. In one embodiment, the braze alloy may comprise about 70.5% Ag, about 26.5% Cu and about 3.0% Ti, available under the trade name of CB4, Braze alloys having a high strength may include Cu, alloys comprising Ni and Cr alloys, and brazes containing high percentages of elements such as Pd and similar high strength materials, and Cr-based active brazes. In one embodiment, the braze alloy may comprise or consist essentially of Ni, Pd and Cr. In some embodiments, the ratio of the weight ratio of Pd to Ni may be in the range from about 0.4 to about 0.8. In one embodiment, the braze alloy may comprise Ni, Pd, Cr, B and Si, and in one embodiment, the weight ratio of Ni to Pd to Cr to B to Si may be about 50:36:10.5:3:0.5, or the weight ratio of Ni to Pd to Cr to B to Si may be about 57:30:10.5:2.4. Braze alloy material comprising Ni, Pd, Cr, B may be obtained under the trade name Palnicro™ 36M from WESGO Metals™. In one embodiment, the braze alloy may comprise Ag, Cu, Ni, Pd and Mn, and in one embodiment, the weight ratio of Ag to Cu to Ni to Pa and Mn may be about 25:37:10:15 and 13. Such a braze alloy may be available under the trade name PALNICUROM™ 10. In one embodiment, the braze alloy may comprise about 64% iron and about 36% nickel, which may be referred to as Invar. In one embodiment, the braze material may comprise a substantially unalloyed metal such as Co. In some embodiments, the braze alloy may comprise at least one element selected from the group consisting of Cr, Fe, Si, C, B, P, Mo, Ni, Co, W, and Pd. One example of a suitable braze alloy may be available from Metglas™ under the trade name MBF 15.

In some embodiments, the braze alloy may comprise at least one of Cu, Ag or Au, and in some embodiments, the braze alloy may further comprise at least one of Ti, V, Cr, Mn, Zr, Nb, Mo, Hf, Ta, W or Re. For example, the braze alloy may contain Au and Ta, or the braze alloy may contain Ag, Cu and Ti. In some embodiments, the braze material may comprise at least one of Fe, Co, Ni or Mn.

In one embodiment of the invention, the method may include coating a surface of the PCD structure to prepare it form brazing, and then brazing the PCD structure to the substrate. Examples of coatings for this purpose and methods of applying them are described in U.S. Pat. Nos. 5,500,248; 5,647,8781; 5,529,805 and PCT patent application publication number 2008/142657.

In one embodiment, the braze layer may contain dispersed ceramic particles, and in one embodiment, the ceramic particles may comprise a carbide material, such as silicon carbide, or a super-hard material such as diamond. In some embodiments, the ceramic particles may have mean size of less than about 20 microns or less than about 10 microns. In some embodiments of the invention, the presence of the ceramic particles in the braze layer may to strengthen it and may reduce the likelihood of the composite compact element failing as a result of the braze.

Embodiments of the invention may be used as gauge trimmers on other types of earth-boring tools, such as cones of roller cone drill bits, reamers, mills, bi-centre bits, eccentric bits, coring bits and so-called hybrid bits that include both fixed cutters and rolling cutters.

Grain contiguity may be determined from SEM images by means of image analysis software. In particular, software having the trade name analySIS Pro from Soft Imaging System® GmbH (a trademark of Olympus Soft Imaging Solutions GmbH) may be used. This software has a "Separate Grains" filter, which according to the operating manual only provides satisfactory results if the structures to be separated are closed structures. Therefore, it is important to fill up any holes before applying this filter. The "Morph. Close" command, for example, may be used or help may be obtained from the "Fillhole" module. In addition to this filter, the "Separator" is another powerful filter available for grain separation. This separator can also be applied to colour- and grey-value images, according to the operating manual.

Figure 12:
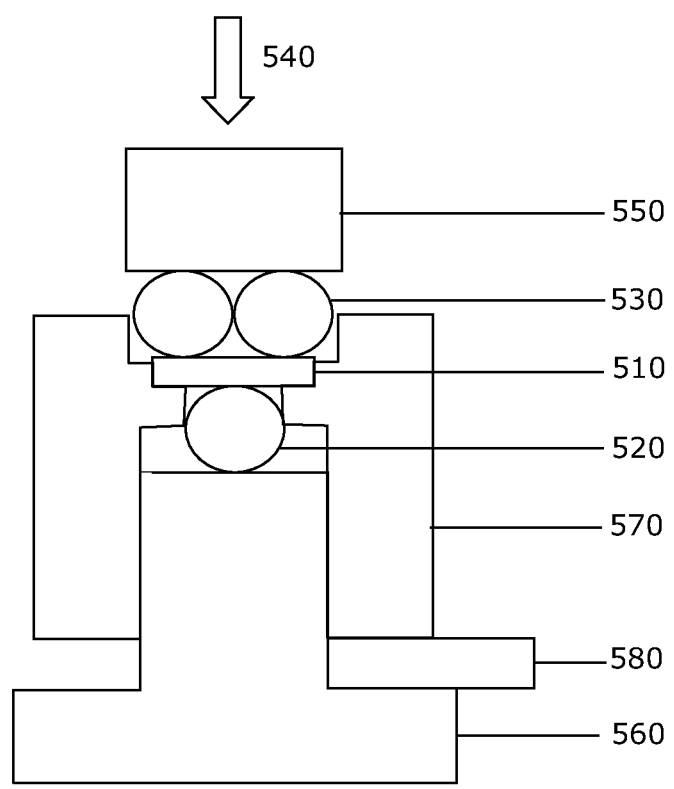
FIG. 12 shows a schematic side view of an apparatus for measuring the transverse rupture strength of a specimen.

As used herein, "transverse rupture strength" (TRS) is measured by subjecting a specimen in the form of a disc to a load applied at three points, two applied on one side of the specimen and one applied on the opposite side, and increasing the load at a loading rate until the specimen fractures. Such a measurement may also be referred to as a three-point bending test, and has been described by Borger et al. (Borger, A., P. Supansic and R. Danner, "The ball on three balls test for strength testing of brittle discs: stress distribution in the disc", Journal of the European Ceramic Society, 2002, volume 22, pp. 1425-1436). With reference to FIG. 12, a specimen 510 of the material to be tested is placed between a load ball 520 and two support balls 530, and supported by a guide body 570. The load ball 520 is supported by a stamp 560, which is supported laterally and guided by a guide body 570, and a chock 580 is disposed between respective parts of the guide body 570 and the stamp 560 and establishes a proximity limit to the movement of the stamp 560 with respect to the guide body 570. A punch 550 abuts support balls 530, which are disposed between the punch 550 and the specimen 510. An axial load 540 is applied to the punch 550 causing the load ball 520 and the support balls 530 to be urged against the specimen 510 from opposite sides. The load is increased at a certain loading rate from a lower limit until evidence of fracture is observed in the specimen 510. As a non-limiting example, an Instron™ 5500R universal testing machine having a load cell of 10 KN may be used for measuring transverse rupture strength as described above. The loading rate may be about 0.9 mm/min. The transverse rupture strength $\sigma$ in MPa is calculated as $f(F) \cdot F/t^2$, where F is the measured load, in Newtons, at which the specimen begins to fracture, t is the thickness of the specimen and f(F) is a dimensionless constant dependent on the load and the material being tested. In the case of PCD, $f(F)=1.620211-0.0082 \times (F-3000)/1000$.

The specimen in the form of a round disc for use in the TRS measurement described above is prepared as follows. A PCD construction comprising a PCD structure joined to a substrate is provided, the outer diameter of which is ground to 16 mm or 19 mm. The substrate is removed, leaving a free-standing the PCD disc, which is then lapped to a thickness in the range from about 1.30 mm to about 2.00 mm. The PCD disc may be treated in acid to remove some or substantially all of the material in the interstices between the diamond grains.

The K1C toughness of a PCD disc is measured by means of a diametral compression test, which is described by Lammer ("Mechanical properties of polycrystalline diamonds", Materials Science and Technology, volume 4, 1988, p. 23.) and Miess (Miess, D. and Rai, G., "Fracture toughness and thermal resistances of polycrystalline diamond compacts", Materials Science and Engineering, 1996, volume A209, number 1 to 2, pp. 270-276).

Embodiments of the invention are described in more detail with reference to the examples below, which are not intended to limit the invention.

Example 1

A PCD disc having thickness of about 2.2 millimeters and diameter of about 16 mm was provided using a known high-pressure high temperature method. The substrate to which the PCD was bonded during the sintering step was removed by grinding, leaving an un-backed, free-standing PCD disc. The PCD comprised coherently bonded diamond grains having a multi-modal size distribution with mean equivalent circle diameter of about 9 microns. Microstructural data for the PCD is shown in Table 1, in which the mean grain size is expressed in terms of equivalent circle diameter and the values shown in parentheses are the respective standard deviations.

TABLE 1

| Mean diamond grain size, microns | Diamond content of PCD, volume % | Filler mean free path, microns | Diamond grain contiguity, % |
|---|---|---|---|
| 9.0 (4.0) | 91 (0.4) | 0.6 (0.5) | 62.0 (1.7) |

The PCD disc was then treated (leached) in acid to remove substantially all of the cobalt solvent/catalyst material throughout the entire PCD structure.

Several additional discs, each having a diameter of about 19 mm, were made as described above and subjected to a range of tests to measure mechanical properties. Mechanical properties of the PCD discs after acid treatment are shown in Table 2, in which the values shown in parentheses are the respective standard deviations. It was found that the TRS of the PCD disc decreased from about 1,493 MPa before leaching to about 1,070 MPa after leaching (i.e. by approximately 28%), and the Young's modulus decreased from about 1,025 GPa to about 864 GPa (i.e. by about 15% to 16%).

TABLE 2

| Transverse rupture strength, MPa | $K_1C$ toughness, $MPa \cdot m^{1/2}$ | Young's modulus, GPa |
|---|---|---|
| 1,070 (100) | 6.8 (0.2) | 864 (14) |

A cobalt-cemented tungsten carbide substrate having substantially the same diameter as the 16 mm PCD disc was provided. A foil of active braze material having thickness of about 100 microns was sandwiched between the PCD disc and the substrate to form a pre-compact element assembly. The braze material comprised 63.00% Ag, 32.25% Cu and 1.75% Ti, and is available under the trade name of Cusil™ ABA. Prior to brazing, the PCD disc was ultrasonically cleaned, and both the tungsten carbide substrate and the braze foil was slightly ground and then ultrasonically cleaned.

The pre-compact element assembly was subjected to heat treatment in a vacuum. The temperature was increased to 920 degrees centigrade over 15 minutes, held at this level for 5 minutes and then reduced to ambient temperature over about 8 to 9 hours. A vacuum of at least $10^{-5}$ millibar was maintained during the heat treatment. Care was taken to avoid or minimise the amount of oxygen and other impurities in the furnace environment. Furthermore, a furnace with convection heating and low temperature gradients was used because the components to be brazed and the braze material should all reach the desired temperature in relatively short time.

The molten braze material was found to infiltrate into the PCD disc to a depth in the range from 10 to 20 microns, leaving a braze layer of about 50 microns to about 80 microns between the PCD and WC substrate. The shear strength of the braze bond was measured to be in the range from 110 MPa to 150 MPa.

A control PCD composite compact element that had not been detached from its original substrate and had not been treated in acid was provided for comparison. The brazed and control composite compacts were processed to form respective cutter elements and subjected to a wear test involving using them to machine a granite block mounted on a vertical turret milling apparatus. The test result is expressed in terms of the depth of the wear scar at the cutting edge of the compact element after a given number of passes. The smaller the wear scar depth, the better. After 55 passes, the wear scar depth of the compact element was about 3.5 mm, compared to about 4 mm for the control element.

Example 2

A PCD compact element having a diameter of 16 mm was prepared as described in Example 1, except that a different braze material was used. The braze material comprised 70.5% Ag, 26.5% Cu and 3.0% Ti, available under the trade name of CB4, and the brazing step was carried out at a temperature of 950 degrees centigrade. The molten braze material was found to infiltrate into the PCD disc to a depth in the range from 5 to 10 microns. The shear strength of the braze bond was found to be in the range from 110 MPa to 150 MPa.

The brazed compact element was subjected to a wear test as described in Example 1. After 55 passes, the wear scar depth of the compact element was about 2 mm.

Example 3

Example 1 was repeated, except that the PCD disc comprised coherently bonded diamond grains having a multimodal size distribution with mean equivalent circle diameter of about 4.6 micrometers. Microstructural data for the PCD is shown in table 3.

TABLE 3

| Mean diamond grain size, microns | Diamond content of PCD, volume % | Filler mean free path, microns | Diamond grain contiguity, % |
|---|---|---|---|
| 4.6 (1.3) | 90.2 (0.3) | 0.4 (0.3) | 58.7 (1.7) |

The PCD disc was then treated in acid to remove substantially all of the cobalt solvent/catalyst material within the interstices between the diamond grains, as is well known in the art.

Several additional discs, each having a diameter of about 19 mm, were made as described above and subjected to a range of tests to measure mechanical properties. Key mechanical properties of the PCD after acid treatment are shown in table 4.

TABLE 4

| Transverse rupture strength, MPa | $K_1C$ toughness, $MPa \cdot m^{1/2}$ | Young's modulus, GPa |
|---|---|---|
| 1,200 (120) | 7.8 (0.8) | Not measured |

The molten braze material was found to infiltrate into the PCD disc to a depth in the range from about 10 microns to 20 about microns. The shear strength of the braze bond was measured to be in the range from 110 MPa to 150 MPa.

The brazed PCD compact element was subjected to a further wear test, wherein the compact element was used to mill a block of granite. After a cutting length of at least 6,000 millimeters, no failure due to the braze joint was observed.

Example 4

PCD composite compact elements each comprising a layer of PCD material having a diameter of 16 mm, in which the mean diamond grain size was about 9 microns and the content of cobalt was about 9.0 volume % were provided by sintering the diamond grains onto respective cemented carbide substrates at a pressure of about 5.5 GPa and a temperature of about 1400 degrees centigrade. Microstructural data for the PCD is shown in Table 5, in which the mean grain size is expressed in terms of equivalent circle diameter.

TABLE 5

| Mean diamond grain size, microns | Diamond content of PCD, volume % | Filler mean free path, microns | Diamond grain contiguity, % |
|---|---|---|---|
| 9.0 (4.0) | 91 (0.4) | 0.6 (0.5) | 62.0(1.7) |

The substrates were removed from the PCD layers, which were then treated in acid to remove substantially all of the cobalt filler material. Inductively coupled plasma (ICP) analysis confirmed the residual presence of about 2 weight %, which is about 1.1 volume % Co in the PCD structure. The residual cobalt may have been trapped within substantially closed pores of the PCD structure. Key mechanical properties of the PCD discs after acid treatment are shown in Table 6, in which the values shown in parentheses are the respective standard deviations. The oxidation onset temperature of the PCD in this cutter was measured to be 870 degrees centigrade.

TABLE 6

| Transverse rupture strength, MPa | $K_1C$ toughness, $MPa \cdot m^{1/2}$ | Young's modulus, GPa |
|---|---|---|
| 831 | 5.6 (0.3) | 844 |

A treated PCD structure was brazed onto a cemented tungsten carbide substrate using an alloy comprising 70.5 weight % Ag, 26.5 weight % Cu and 3.0 weight % Ti, a formulation available under the trade name CB4 from BrazeTec™. The brazing was carried out in a vacuum furnace, under a vacuum of $10^{-6}$ mbar, at 950 degrees centigrade for about 5 minutes. The shear strength of the braze bond between the PCD structure and the substrate was about 287 MPa at room temperature and about 224 MPa at 300 degrees centigrade.

A control PCD composite compact element that had not been detached from its original substrate and had not been treated in acid was provided for comparison. The brazed compact and the control composite compacts were processed to form respective cutter elements and subjected to a wear test involving using them to machine a granite block mounted on a vertical turret milling apparatus. The test result can be expressed in terms of the depth of the wear scar or area of wear scar at the cutting edge of the compact element after a given number of passes. The smaller the wear scar depth or area, the better. After 55 passes, the wear scar area of the example compact element was about 5.2 mm$^2$, compared to about 18.9 mm$^2$ for the control element.

Example 5

PCD structures in the form of discs having a diameter of 16 mm and in which the diamond grains had a mean size of about 9 microns were manufactured by sintering the grains onto respective substrates at a pressure of about 6.8 GPa and a temperature of about 1,400 degrees centigrade. Microstructural data for the PCD is shown in Table 7, in which the mean grain size is expressed in terms of equivalent circle diameter.

TABLE 7

| Mean diamond grain size, microns | Diamond content of PCD, volume % | Filler mean free path, microns | Diamond grain contiguity, % |
|---|---|---|---|
| 9 (4) | 91.4 (0.4) | 0.7 (0.6) | 63.0 (1.5) |

The substrates were removed and the PCD structures were treated in acid to remove substantially all of the cobalt filler material. Key mechanical properties of the PCD discs after acid treatment are shown in Table 8, in which the values shown in parentheses are the respective standard deviations.

TABLE 8

| Transverse rupture strength, MPa | $K_1C$ toughness, $MPa \cdot m^{1/2}$ | Young's modulus, GPa |
|---|---|---|
| 983 | Not measured | 927 |

A treated PCD disc was brazed onto a cemented tungsten carbide substrate using an alloy comprising 70.5 weight % Ag, 26.5 weight % Cu and 3.0 weight % Ti, a formulation available under the trade name CB4 from BrazeTec™, as described in Example 4.

The brazed compact was processed to form a cutter element and subjected to a wear test involving using it to machine a granite block mounted on a vertical turret milling apparatus. The test result can be expressed in terms of the depth of the wear scar or area of wear scar at the cutting edge of the compact element after a given number of passes. The smaller the wear scar depth or area, the better. After 55 passes, the wear scar area of the example compact element was about 3.26 mm$^2$, compared to about 18.9 mm$^2$ for the control element described in Example 4.

Example 6

PCD structures in the form of discs having a diameter of 16 mm and in which the diamond grains had a mean size of about 4 microns and which contained about 10 volume % cobalt, were manufactured by sintering the grains onto respective substrates at a pressure of about 5.5 GPa and a temperature of about 1,400 degrees centigrade. Microstructural data for the PCD is shown in Table 9, in which the mean grain size is expressed in terms of equivalent circle diameter.

TABLE 9

| Mean diamond grain size, microns | Diamond content of PCD, volume % | Filler mean free path, microns | Diamond grain contiguity, % |
|---|---|---|---|
| 4.2 (1.6) | 89.2 (0.5) | 0.4 (0.3) | 65 (1) |

The substrate was removed and the PCD structure was treated in acid to remove substantially all of the cobalt filler material. Key mechanical properties of the PCD disc after acid treatment are shown in Table 8, in which the values shown in parentheses are the respective standard deviations.

TABLE 10

| Transverse rupture strength, MPa | K$_1$C toughness, MPa · m$^{1/2}$ | Young's modulus, GPa |
|---|---|---|
| 1,058 | 6.9 | 846 |

The treated PCD disc was brazed onto a cemented tungsten carbide substrate using an alloy comprising 70.5 weight % Ag, 26.5 weight % Cu and 3.0 weight % Ti, a formulation available under the trade name CB4 from BrazeTec™, as described in Example 4.

A control PCD composite compact element that had not been detached from its original substrate and had not been treated in acid was provided for comparison. The brazed and control composite compacts were processed to form respective cutter elements and subjected to a wear test involving using them to machine a granite block mounted on a vertical turret milling apparatus. The test result can be expressed in terms of the depth of the wear scar or area of wear scar at the cutting edge of the compact element after a given number of passes. The smaller the wear scar depth or area, the better. After 55 passes, the wear scar area of the example compact element was about 3.33 mm$^2$, compared to about 4.09 mm$^2$ for the control element.

Example 7

PCD structures in the form of discs, in which the diamond grains had a mean size of about 4 microns and containing about 10 volume % cobalt, were manufactured by sintering the grains onto respective substrates at a pressure of about 6.8 GPa and a temperature of about 1,400 degrees centigrade. Microstructural data for the PCD is shown in Table 11, in which the mean grain size is expressed in terms of equivalent circle diameter.

TABLE 11

| Mean diamond grain size, microns | Diamond content of PCD, volume percent | Filler mean free path, microns | Diamond grain contiguity, percent |
|---|---|---|---|
| 4.3 (1.2) | 89 (1) | 1 (1.6) | 57.8 (1) |

The substrates were removed and the PCD structures were treated in acid to remove substantially all of the cobalt filler material.

A treated PCD was brazed onto a cemented tungsten carbide substrate using an alloy comprising 70.5 weight % Ag, 26.5 weight % Cu and 3.0 weight % Ti, a formulation available under the trade name CB4 from BrazeTec™, as described in Example 4.

The brazed composite compact was processed to form a utter element and subjected to a wear test involving using it to machine a granite block mounted on a vertical turret milling apparatus. The test result can be expressed in terms of the depth of the wear scar or area of wear scar at the cutting edge of the compact element after a given number of passes. The smaller the wear scar depth or area, the better. After 55 passes, the wear scar area of the example compact element was about 3.28 mm$^2$, compared to about 4.09 mm$^2$ for the control element described in Example 6.

Example 8

PCD discs were provided and treated as described in Example 4, and a treated PCD disc was brazed onto a cemented tungsten carbide substrate using a braze alloy comprising 86.0 weight % Cu, 12.0 weight % Mn and 2.0 weight % Ni at 1050 degrees centigrade for about 5 minutes in vacuum. The braze material was available as 21/80 from BrazeTec™.

The brazed composite compact was processed to form a cutter element and subjected to a wear test involving using it to machine a granite block mounted on a vertical turret milling apparatus. The test result can be expressed in terms of the depth of the wear scar or area of wear scar at the cutting edge of the compact element after a given number of passes. The smaller the wear scar depth or area, the better. After 55 passes, the wear scar area of the example compact element was about 3.65 mm$^d$, compared to about 18.9 mm$^2$ for the control element described in Example 4.

Example 9

PCD discs were provided and treated as described in Example 4, and a treated disc was glued onto a cemented tungsten carbide substrate using Permabond ES550™ epoxy resin at about 100 degrees centigrade for about 2 hours.

The brazed and control composite compact was processed to form a cutter element and subjected to a wear test involving using it to machine a granite block mounted on a vertical turret milling apparatus. The test result can be expressed in terms of the depth of the wear scar or area of wear scar at the cutting edge of the compact element after a given number of passes. The smaller the wear scar depth or area, the better. After 55 passes, the wear scar area of the example compact element was about 4.44 mm$^2$, compared to about 18.9 mm$^2$ for the control element described in Example 4.

Example 10

A PCD disc was provided and treated as described in Example 4, and was brazed onto a cemented tungsten carbide substrate using a braze alloy comprising 68.8 weight % Ag, 26.7 weight % Cu and 4.5 weight % Ti alloy at about 950 centigrade for about 5 minutes in vacuum. The braze material was available under the product name Ticusil™ from Wesgo™.

Example 11

A PCD disc was provided and treated as described in Example 4, and was brazed onto a cemented tungsten carbide substrate using a braze alloy comprising 68.8 weight % Ag, 26.7 weight % Cu and 4.5 weight % Ti alloy at about 950 centigrade for about 5 minutes in an argon atmosphere. The braze material was available under the product name Ticusil™ from Wesgo™. The shear strength of the braze bond was about resultant cutting element had bond shear strength of 215 MPa at room temperature.

Known PCD composite compact elements comprising PCD structures brazed to substrates have lacked commercially success, particularly in harsh applications such as drilling into rock, especially in the oil and gas drilling industry. Such applications require cutter compact elements capable of maintaining extreme abrasion resistance and high strength at high temperatures experienced in use, typically in excess of 600 degrees centigrade. While wanting not to be bound by theory, brazing of PCD to carbide may give rise to high internal stresses within the compact element proximate the braze interface, resulting in cracking of the PCD and/or the substrate or the delamination of the PCD even before the compact element is used to bore into rock. Embodiments of PCD composite compact elements according to the invention, particularly embodiments in which the PCD structure is thermally stable may be economically viable and commercially successful.

Embodiments of the invention in which the PCD structure has a mean Young's modulus of at least about 800 GPa may better retain its mechanical integrity and robustness after being bonded to the substrate. If the Young's modulus is substantially less than about 800 GPa, or if the transverse rupture strength is substantially less than about 900 MPa, the PCD structure may not be able to cut rock efficiently and may wear too rapidly. Embodiments of PCD that have a homogeneous microstructure, characterised in terms of the combination of the interstitial mean free path and the standard deviation of the interstitial mean free path, may have enhanced resistance to mechanical and thermal stress and shock, as may be experience when brazing the PCD to a substrate and using the composite compact to degrade or bore into rock.

Embodiments having the combination of the high contiguity and/or high homogeneity and/or reduced content of metallic solvent/catalyst within the PCD structure, and a size distribution comprising at least two or three peaks or modes, have the advantage of bonding particularly well using conventional brazing. Embodiments may exhibit superior durability over prior art cutter elements comprising PCD brazed to a substrate.

Embodiments of the invention may have the advantage that the strength with which the PCD structure is bonded to the substrate may be substantially enhanced. In particular, embodiments in which the PCD structure is brazed to the substrate and in which the PCD structure contains braze material to a depth of at least about 2 microns from an interface with the braze layer may have exhibit a particularly enhanced strength of bonding. Consequently, the mechanical properties and working life of such embodiments may be enhanced, particularly when used to bore into rock.

Embodiments of the invention in which the shear strength of the bond between the PCD structure and the substrate is at least about 100 MPa and at most about 500 MPa, may have the advantage that conventional brazing methods may be adequate.

Embodiments of the invention in which the PCD structure is thermally stable may have the advantage that the PCD structure better retains its structural integrity and key mechanical properties after being bonded to the substrate by means of a method involving heating the PCD structure, such as brazing. Embodiments of the invention in which the PCD structure has a filler comprising carbide or intermetallic compounds may have enhanced thermal stability and better retain key mechanical properties after being bonded to the substrate, such as by brazing.

Embodiments of the invention in which the substrate comprises cemented carbide and includes diamond particles dispersed in it may have enhanced mechanical robustness, particularly fracture resistance.

Embodiments of the invention in which the PCD structure comprises at least 90 volume percent diamond grains having a mean size of at most about 10 microns may be especially advantageous. Embodiments of PCD structures having a multi-modal diamond grain size distribution have sufficient strength to retain better their mechanical integrity and key properties after bonding to the substrate, such as by brazing.

Embodiments of the invention may have the advantage that the composition of the PCD structure, particularly the composition of the filler material, may be selected with fewer constraints associated with the composition of the substrate. PCD structures having desirable properties, particularly high thermal stability, can be made separately from the substrate and then bonded to the substrate using known brazing materials and methods, thereby improving the performance of the PCD tool without incurring substantial additional costs.

Although the foregoing description of PCD composite compact element, tools, manufacturing methods and various applications contain many specific details, these should not be construed as limiting the scope of the invention, but merely as providing illustrations of some example embodiments. Similarly, other embodiments of the invention may be devised which do not depart from the spirit or scope of the present invention. The scope of the invention is indicated and limited only by the appended claims and their legal equivalents, rather than by the foregoing description. All additions, deletions, and modifications to the invention, as disclosed herein, which fall within the meaning and scope of the claims are to be embraced.

The invention claimed is:

1. A PCD composite compact element comprising a substrate, a sintered PCD structure bonded to the substrate, and a bond material bonding the PCD structure to the substrate; the PCD structure being thermally stable and having a mean Young's modulus of at least about 800 GPa, the PCD structure having an interstitial mean free path of at least about 0.05 microns and at most about 1.5 microns; the standard deviation of the mean free path being at least about 0.05 microns and at most about 1.5 microns: the bond material being a braze alloy in the form of a braze layer between the PCD structure and the substrate: wherein the PCD structure comprises braze material to a depth of at least about 2 microns from an interface with the braze layer.

2. A PCD composite compact element as claimed in claim 1, in which the braze alloy has a melting onset temperature of at most about 1,050 degrees centigrade and contains at least one element selected from the group consisting of Ti, V, Cr, Mn, Zr, Nb, Mo, Hf, Ta, W and Re.

3. A PCD composite compact element as claimed in claim 2, in which the substrate comprises PCD material.

4. A PCD composite compact element as claimed in claim 2, in which there is less than about 5 volume percent of solvent/catalyst for diamond in the PCD structure.

5. A PCD composite compact element as claimed in claim 2, in which the PCD structure has a mean diamond grain contiguity of at least about 60 percent.

6. A PCD composite compact element as claimed in claim 2, in which the PCD structure has transverse rupture strength of at least about 900 MPa.

7. A PCD composite compact element as claimed in claim 2, in which the PCD structure is not substantially entirely porous and has a mean Young's modulus of at least about 900 GPa, and a transverse rupture strength of least about 1,000 MPa.

8. A PCD composite compact element as claimed in claim 1, in which the bond material comprises an epoxy material for joining ceramic materials.

9. A PCD composite compact element as claimed in claim 1, in which the PCD structure is at least partially porous.

10. A PCD composite compact element as claimed in claim 1, in which the substrate includes diamond particles dispersed within it.

11. A PCD composite compact element as claimed in claim 1, secured to a drill bit or other earth boring tool.

12. A PCD composite compact element comprising a sintered PCD structure bonded to a substrate by means of a bond material; the sintered PCD structure being thermally stable and having a mean Young's modulus of at least about 800 GPa and a mean diamond grain contiguity greater than about 60 percent; the bond material being a braze alloy in the form of a braze layer between the sintered PCD structure and the substrate; wherein the PCD structure comprises braze material to a depth of at least about 2 microns from an interface with the braze layer.

13. A PCD composite compact element as claimed in claim 12, in which the braze alloy has a melting onset temperature of at most about 1,050 degrees centigrade and contains at least one element selected from the group consisting of Ti, V, Cr, Mn, Zr, Nb, Mo, Hf, Ta, W and Re.

14. A PCD composite compact element as claimed in claim 13, in which there is less than about 5 volume percent of solvent/catalyst for diamond in the PCD structure.

15. A PCD composite compact element as claimed in claim 13, secured to a drill bit or other earth boring tool.

16. A PCD composite compact element as claimed in claim 13, in which the PCD structure has an interstitial mean free path in the range from about 0.05 micron to about 1.5 microns; and the standard deviation of the mean free path is in the range from about 0.05 micron to about 1.5 microns.

17. A PCD composite compact element as claimed in claim 13, in which the PCD structure has transverse rupture strength of at least about 900 MPa.

18. A PCD composite compact element as claimed in claim 12, in which the bond material comprises an epoxy material for joining ceramic materials.

19. A PCD composite compact element as claimed in claim 12, in which the PCD structure is at least partially porous.

20. A PCD composite compact element as claimed in claim 12, in which the substrate includes diamond particles dispersed within it.

21. A PCD composite compact element as claimed in claim 12, in which the PCD structure is not substantially entirely porous and has a mean Young's modulus of at least about 900 GPa, and a transverse rupture strength of least about 1,000 MPa.

* * * * *